Dec. 3, 1935. R. W. POYER 2,023,098
HANDLE
Filed June 14, 1934
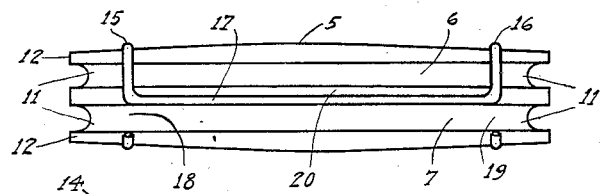
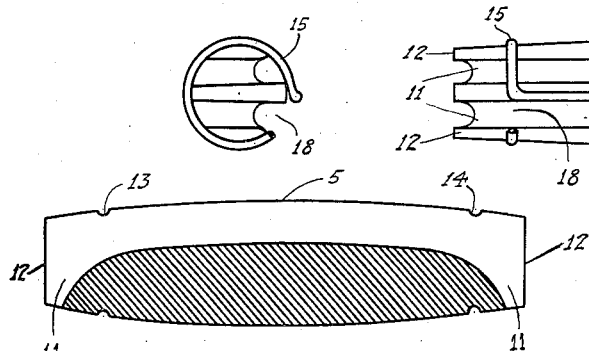
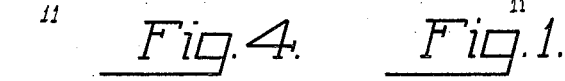
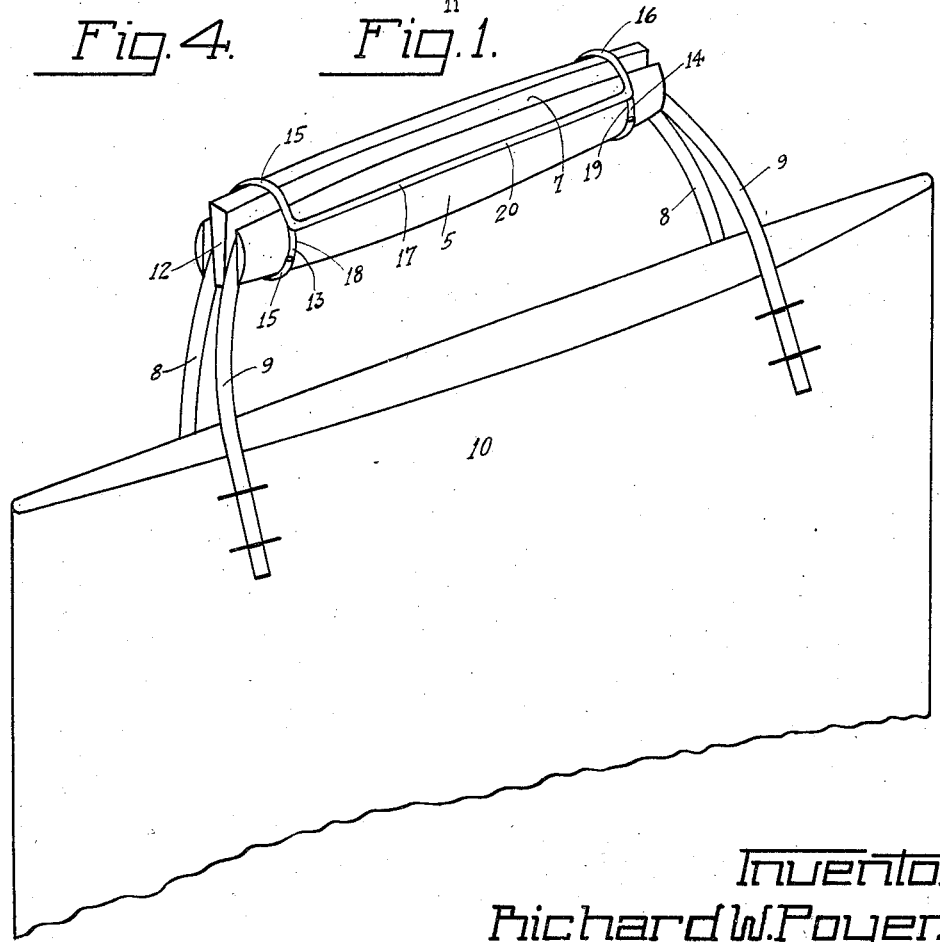

Patented Dec. 3, 1935

2,023,098

UNITED STATES PATENT OFFICE 2,023,098

HANDLE

Richard W. Poyer, Des Plaines, Ill.

Application June 14, 1934, Serial No. 730,586

6 Claims. (Cl. 229—54)

My invention relates to an improvement in handles adapted to be used where the object to be carried is provided with a bail or a cord handle or handles and relates particularly to a handle for carrying market bags of the type provided with a pair of cord handles attached to each side of the bag near the upper edge thereof.

The purpose of my invention is the provision of an auxiliary handle which may be quickly and easily though positively secured to carriers provided with proper handles to facilitate the use of the carrier.

An object of my invention is the provision of such a detachable handle which is simply, easily and inexpensively constructed.

A further object of my invention is the provision of a detachable handle which is quickly associated with or dissociated from the object to be carried.

A feature of my invention is the provision of a rotatable locking member for positively preventing any unauthorized detachment of the handle from the carrier.

A still further object is the provision of a handle having the above characteristics and not having any projections or sharp corners or the like which would interfere with the transporting of a handle in a pocket or purse or similar place.

Other objects and features of my invention will be disclosed from time to time as the description of the invention progresses.

In the accompanying drawing like reference characters indicate like parts and

Fig. 1 is a view of the handle of my invention secured to the rope handles of a market or shopping bag;

Fig. 2 is a top view of the handle of my invention;

Fig. 3 is a view showing in detail the looped end of the locking member and the grooves associated therewith in my improved handle; and Fig. 4 is a longitudinal sectional view of the handle.

The handle 5 of my invention is made of wood or any other suitable material and is of a size and shape to be held comfortably in the hand; the preferred embodiment being substantially barrel-shaped. A pair of parallel longitudinal slots 6 and 7 are provided and are of a size to receive the cord handles 8 and 9 of a shopping bag 10. The ends 11 of the slots or groves are deeper than the middle section so that the bottoms of the grooves are arcuate in shape as shown in Fig. 4, and terminate short of the ends 12 of the handle 5 a distance substantially equal to the thickness of the rope handles 8 and 9 of the bag 10.

Circumferential grooves 13 and 14 are provided near the ends 12 of the handle 5 and are of a size to receive the looped ends 15 and 16 of a lock 17 formed preferably of wire. Each of the looped ends 15 and 16 fit respectively in the circumferential grooves 13 and 14 but the looped wire does not extend entirely around the handle 5 as gaps 18 and 19 are left. The forming of the loops places the wire under a spring tension which tends to cause the loops to press against the handle 5 to prevent movement of the lock 17. These gaps 18 and 19 are substantially equal in size to the thickness of the longitudinal grooves or slots 6 and 7.

The lock 17 has a connecting portion 20 which connects the looped ends 15 and 16 together to form a rotatable unit. This connecting portion 20 fits against the handle 5 but is of a thickness sufficient to enable the user to press his thumb or finger against it and thereby rotate the lock 17 as a unit. That is, pressure applied to the portion 20 causes the looped ends 15 and 16 to rotate in the grooves 13 and 14.

The handle 5 is attached to the bag or other carrier in the following manner. The lock 17 is rotated until the gaps 18 and 19 are directly over one of the grooves or longitudinal slots 6 and 7, for the purposes of illustration let us say slot 6. The rope handle 8 is placed in the slot 6 and the lock 17 is then rotated until the gaps 18 and 19 are directly over the slot 7 and the rope handle 9 is then placed in the said slot 7. Further rotation of the lock 17 places the wire forming the looped ends 15 and 16 over the cord or rope handles and effectually locks them in the grooves 6 and 7. The looped ends 15 and 16 may be placed under sufficient tension to assure the lock 17 remaining in any position to which it may be adjusted.

My improved handle is also adapted to be used in carrying pails or cans such as paint cans which are provided with wire bails for carrying them. The longitudinal grooves 6 and 7 are of a size to receive the wire bail and are so arranged as to center itself on the said bail to facilitate the carrying of the pail or can.

The handle 5 may be left on the bail as it will retain its position thereon and will not slip or slide down to one side. The handle 5 may be retained in position on one of the cord handles of a shopping bag when the bag is being unpacked or when the bag is not in use. As it has no sharp projections or catches it lends itself readily to being carried in a person's pocket or purse so as to be instantly available for use should the occasion arise.

While I have described my invention in certain particular embodiments, I desire that it be understood that modifications and alterations may be made without departing from the spirit and scope of the appended claims.

Having described my invention, what I claim as new and desire to secure by United States Letters Patent is:

1. A handle for a shopping bag having a pair of parallel longitudinal grooves adapted to receive the handles of a shopping bag, circumferential grooves adjacent the ends of said handle, a locking member having a loop at each end thereof fitting in said circumferential grooves respectively.

2. An auxiliary detachable handle provided with a longitudinal groove for receiving a bail, circumferential grooves, a locking member having a loop at each end rotatable in said circumferential grooves for locking said bail in said longitudinal groove.

3. An auxiliary handle having a pair of longitudinal grooves for receiving handles of a shopping bag, circumferential grooves for said handle, a locking member having looped ends rotatable in said circumferential grooves, said looped ends each being provided with a gap adapted to fit over one of said longitudinal grooves.

4. An auxiliary handle having a pair of longitudinal grooves for receiving handles of a carrier, circumferential grooves for said handle, a locking member having looped ends adapted to fit in said circumferential grooves, said looped ends each having a gap therein and means for rotating said locking member.

5. An auxiliary handle for a carrier provided with cord handles, longitudinal grooves in said handle, said grooves being deeper at the ends of said handle than the middle thereof and the bottom of said grooves terminating short of the ends of said handle, and a locking member for locking said cord handles in said grooves.

6. An auxiliary handle for a carrier provided with cord handles, longitudinal grooves in said handle, said grooves being deeper at the ends of said handle than the middle thereof and the bottom of said grooves terminating short of the ends of said handle, circumferential grooves for said handle, and a locking member adapted to fit in said circumferential grooves.

RICHARD W. POYER.